(12) United States Patent
Nagata et al.

(10) Patent No.: US 9,124,320 B2
(45) Date of Patent: *Sep. 1, 2015

(54) MOBILE TERMINAL APPARATUS, RADIO BASE STATION APPARATUS AND RADIO COMMUNICATION METHOD

(75) Inventors: Satoshi Nagata, Tokyo (JP); Tetsushi Abe, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 176 days.

This patent is subject to a terminal disclaimer.

(21) Appl. No.: 13/978,330

(22) PCT Filed: Dec. 9, 2011

(86) PCT No.: PCT/JP2011/078582
§ 371 (c)(1),
(2), (4) Date: Jul. 29, 2013

(87) PCT Pub. No.: WO2012/093555
PCT Pub. Date: Jul. 12, 2012

(65) Prior Publication Data
US 2013/0294279 A1 Nov. 7, 2013

(30) Foreign Application Priority Data
Jan. 7, 2011 (JP) ................................ 2011-002111

(51) Int. Cl.
*H04Q 7/00* (2006.01)
*H04B 7/04* (2006.01)
*H04B 7/02* (2006.01)
*H04L 25/03* (2006.01)
*H04L 25/02* (2006.01)

(52) U.S. Cl.
CPC .............. *H04B 7/0456* (2013.01); *H04B 7/024* (2013.01); *H04L 25/03904* (2013.01); *H04L 25/0226* (2013.01); *H04L 25/03955* (2013.01)

(58) Field of Classification Search
None
See application file for complete search history.

(56) References Cited

U.S. PATENT DOCUMENTS 8,634,841 B2 * 1/2014 Lee et al. ....................... 455/450
2012/0189077 A1 * 7/2012 Seo et al. ....................... 375/267

OTHER PUBLICATIONS

International Search Report issued in PCT/JP2011/078582 mailed on Mar. 13, 2012 (2 pages).

(Continued)

*Primary Examiner* — Duc C Ho
(74) *Attorney, Agent, or Firm* — Osha Liang LLP

(57) ABSTRACT

A mobile terminal apparatus estimates downlink channel states using respective reference signals included in downlink signals from plural cells; selects PMIs (Precoding Matrix Indicators) using a codebook based on the channel states; estimates a phase difference between the cells based on the selected PMIs or the channel states; and transmits information of the phase difference and the selected PMIs to radio base station apparatuses of the respective cells. A radio base station apparatus receives an uplink signal including a PMI and the information of the phase difference between the cells; multiplies a transmission signal by a precoding weight corresponding to the PMI; adjusts the phase difference between the cells with use of the information of the phase difference between the cells; and transmits the transmission signal to a radio base station apparatus of another cell by coordinated multi-point transmission.

8 Claims, 13 Drawing Sheets

(56) References Cited

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

* cited by examiner

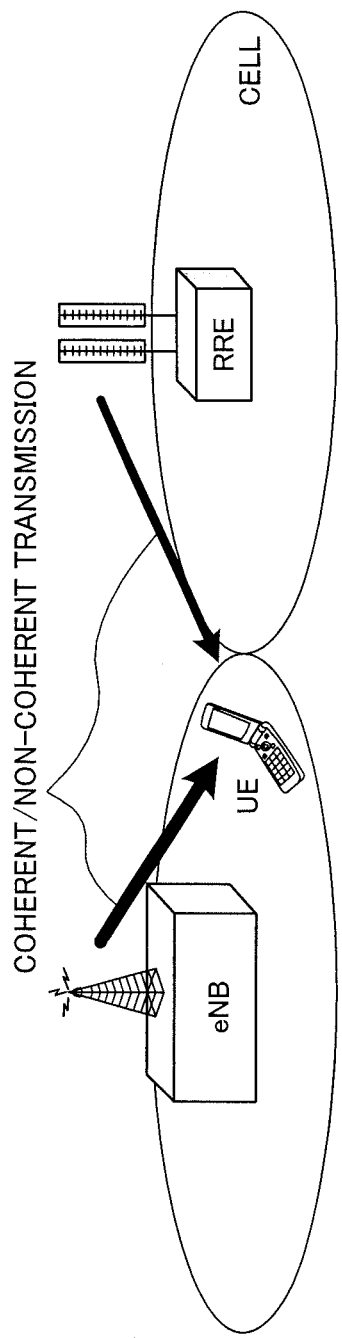
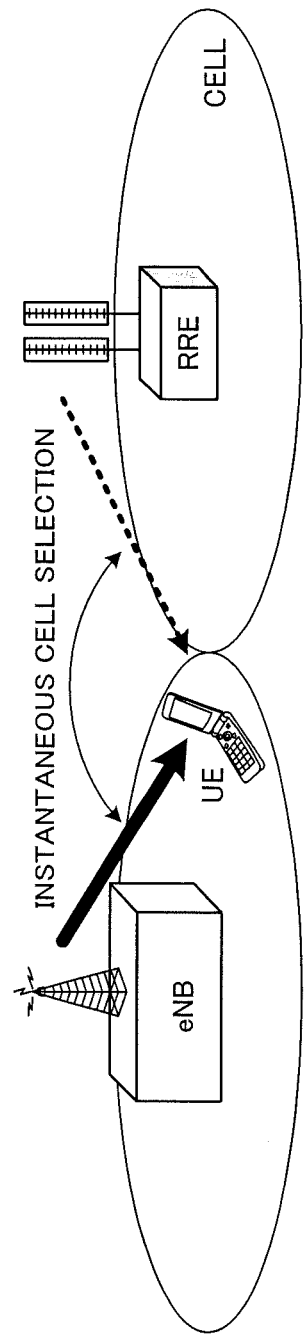
FIG. 1A
FIG. 1B

|  |  | BITS |
|---|---|---|
| 60° ⎫ | PHASE | 00 |
| 120° ⎬ | DIFFERENCE | 01 |
| 180° ⎭ | INFORMATION | 10 |
| eNB #2 | CELL SELECTION INFORMATION | 11 |

FIG. 5A

|  |  | BITS |
|---|---|---|
| 60° ⎫ | PHASE | 00 |
| 120° ⎬ | DIFFERENCE | 01 |
| 180° ⎬ | INFORMATION | 10 |
| 240° ⎭ |  | 11 |
| eNB #1 ⎫ | CELL SELECTION | 0 |
| eNB #2 ⎭ | INFORMATION | 1 |

FIG. 5B

MOBILE TERMINAL APPARATUS, RADIO BASE STATION APPARATUS AND RADIO COMMUNICATION METHOD

TECHNICAL FIELD

The present invention relates to a mobile terminal apparatus, a radio base station apparatus and a radio communication method in a next-generation mobile communication system.

BACKGROUND ART

In a UMTS (Universal Mobile Telecommunications System) network, for the purposes of improving spectral efficiency and improving the data rates, system features based on W-CDMA (Wideband Code Division Multiple Access) are maximized by adopting HSDPA (High Speed Downlink Packet Access) and HSUPA (High Speed Uplink Packet Access). For this UMTS network, for the purposes of further increasing high-speed data rates, providing low delay and so on, long-term evolution (LTE) has been under study (see, for example, Non-Patent Literature 1).

In an LTE system, there has been proposed a multiple input multiple output (MIMO) system as a radio communication technique for improving a data rate (spectrum efficiency) by transmitting and receiving data with use of a plurality of antennas (see e.g., Non Patent Literature 1). In MIMO transmission, an optimal preceding matrix indicator (PMI) is selected, at the receiver side, from a codebook in which a plurality of phase/amplitude control amounts (precoding matrix (precoding weight)) to be set for the antennas of the transmitter and a plurality of PMIs corresponding to the precoding matrix are defined per rank, and the optimal PMI is fed back to the transmitter. In addition, a rank indicator (RI) indicating the optimal rank is selected and fed back to the transmitter. At the transmitter side, a precoding weight for each transmission antenna is specified based on the PMI and the RI fed back from the receiver, the precoding is performed, and then, transmission information sequences are transmitted.

In the third-generation system, it is possible to achieve a transmission rate of maximum approximately 2 Mbps on the downlink by using a fixed band of approximately 5 MHz. Meanwhile, in the LTE system, it is possible to achieve a transmission rate of about maximum 300 Mbps on the downlink and about Mbps on the uplink by using a variable band which ranges from 1.4 MHz to 20 MHz. Furthermore, in the UMTS network, for the purpose of achieving further broadbandization and higher speed, successor systems to LTE have been under study (for example, LTE Advanced (LTE-A)).

CITATION LIST

Non-Patent Literature

Non-Patent Literature 1: 3GPP, TR25.912 (V7.1.0), "Feasibility study for Evolved UTRA and UTRAN", September 2006

SUMMARY OF THE INVENTION

Technical Problem

As one of promising techniques to improve the system performance of the Rel-8 LTE system, there has been proposed inter-cell orthogonalization. In the LTE system Rel-10 or later (LTE-A system), intra-cell orthogonalization has been realized by orthogonal multi access on both of uplink and downlink. That is, on the downlink, orthogonalization is achieved between mobile terminal apparatuses (UE: user equipment) in a frequency domain. However, the inter-cell technique is based on interference randomization by one-cell frequency reuse, like in W-CDMA. In 3GPP (3rd Generation Partnership Project), as a technique to realize the inter-cell orthogonalization, there has been studied CoMP (Coordinated Multi-Point transmission/reception). In CoMP, a plurality of cells coordinate to perform signal processing for transmission/reception of one or a plurality of mobile terminal apparatuses. Specifically, on the downlink, there have been studied plural-cell synchronous transmission employing precoding, coordinated scheduling/beamforming and so one.

As a result in the LTE-A system (LTE system Rel-10 or later), it has been desired to improve spectrum efficiency and realize the inter-cell orthogonalization. Then, there is a demand for enhancement in effects of the MIMO technique and CoMP technique, when both of the techniques are applied.

The present invention was carried out in view of the foregoing and aims to provide a mobile terminal apparatus, a radio base station apparatus and a radio communication method capable of making the most of the effects of the MIMO technique and the CoMP technique, when employing both of the techniques.

Solution to Problem

The present invention provides a mobile terminal apparatus comprising: a channel estimating section configured to estimate downlink channel states using respective reference signals included in downlink signals from a plurality of cells; a PMI selecting section configured to select PMIs using a codebook based on the channel states; a phase difference estimating section configured to estimate a phase difference between the cells based on the selected PMIs or the channel states; and a transmitting section configured to transmit information of the phase difference and the selected PMIs to radio base station apparatuses of the respective cells.

The present invention further provides a radio base station apparatus comprising: a receiving section configured to receive an uplink signal including a PMI and information of a phase difference between cells; a multiplying section configured to multiply a transmission signal by a precoding weight corresponding to the PMI; a transmitting section configured to adjust the phase difference between the cells with use of the information of the phase difference between the cells and transmit the transmission signal to a radio base station apparatus of another cell by coordinated multi-point transmission.

The present invention further provides a radio communication method comprising the steps of: in a mobile terminal apparatus, estimating downlink channel states using respective reference signals included in downlink signals from a plurality of cells; selecting PMIs using a codebook based on the channel states; estimating a phase difference between the cells based on the selected PMIs or the channel states; and transmitting information of the phase difference and the selected PMIs to radio base station apparatuses of the respective cells; in at least one of the radio base station apparatuses, receiving an uplink signal including a PMI and the information of the phase difference between the cells; multiplying a transmission signal by a precoding weight corresponding to the PMI; adjusting the phase difference between the cells with use of the information of the phase difference between the cells; and transmitting the transmission signal to a radio base station apparatus of another cell by coordinated multi-point transmission.

Technical Advantage of the Invention

According to the present invention, in a mobile terminal apparatus, reference signals contained in downlink signals from a plurality of cells are used to estimate respective downlink channel states, PMIs are selected from a codebook based on the respective, channel states, the selected PMIs or the channel states are used as a basis to estimate a phase difference between cells, and information of the phase difference and the selected PMIs are transmitted to radio base station apparatuses of the cells. In a radio base station apparatus, an uplink signal containing the information of the phase difference between the cells and PMI is received, a transmission signal is multiplied by a precoding weight corresponding to the PMI, the information of the phase difference between the cells is used to adjust a phase difference between the cells, and the transmission signal is transmitted to the radio base station apparatus of another cell by CoMP transmission. With this structure, when employing both of the MIMO technique and the CoMP technique, it is possible to make the most of the effects of these techniques.

BRIEF DESCRIPTION OF THE DRAWINGS

FIGS. 1A and 1B are diagrams for explaining coordinated multi-point transmission;
FIGS. 5A and 5B are diagrams each for explaining a quantization method according to the embodiment of the present invention.

DESCRIPTION OF EMBODIMENTS

With reference to the accompanying drawings, embodiments of the present invention will be described in detail below.

First description is made about downlink CoMP transmission. The downlink CoMP transmission includes coordinated scheduling/coordinated beamforming and joint processing. Coordinated scheduling/coordinated beamforming is a method of transmitting to a mobile terminal apparatus from one cell, in which radio resources are allocated in frequency/space domain in consideration of interference from other cells and interference to other cells. Joint processing is a plural-cell synchronous transmission employing precoding and includes joint transmission of transmitting to a mobile terminal apparatus from a plurality of cells as illustrated in FIG. 1A and dynamic cell selection of selecting a cell instantaneously as illustrated in FIG. 1B.

Figure 2A:
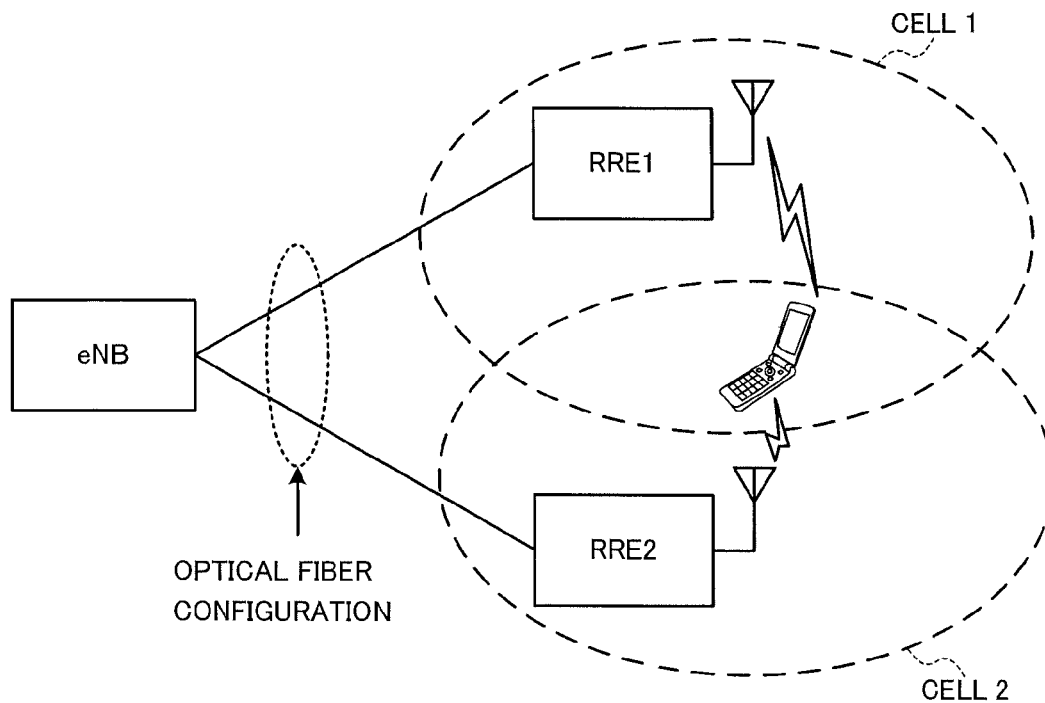
FIGS. 2A and 2B are diagrams each for explaining a configuration of a radio base station apparatus.
Figure 2B:
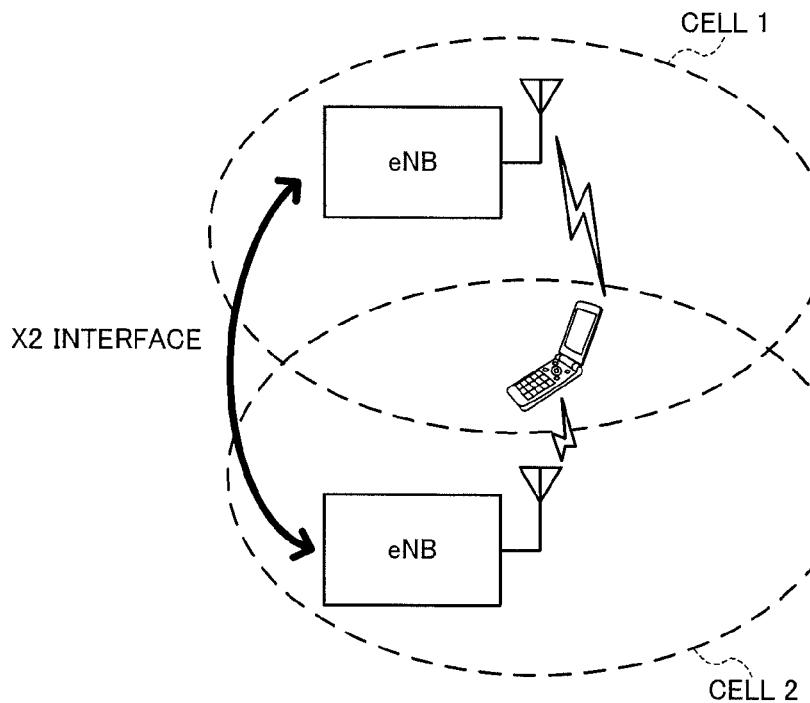

As a configuration to realize CoMP, there are a configuration including a radio base station apparatus (radio base station apparatus eNB) and a plurality of remote radio apparatuses (RRE: Remote Radio Equipment) connected to the radio base station apparatus eNB by optical fiber configuration as illustrated in FIG. 2A and a configuration of a radio base station apparatus (radio base station apparatus eNB) as illustrated in FIG. 2B. The former is centralized control based on a remote radio apparatus configuration, and the latter is autonomous distributed control based on an independent base station configuration.

In the configuration illustrated in FIG. 2A (RRE configuration), the radio base station apparatus eNB makes a centralized control of the remote radio apparatuses RRE1 and RRE2. In the RRE configuration, the radio base station apparatus eNB (centralized base station) to perform baseband signal processing of a plurality of RRE apparatuses and control them and each cell, that is, RRE are connected by baseband signals using an optical fiber so that the centralized base station can make a centralized control of radio resources between cells. In other words, overhead and delay in signaling between radio base station apparatuses, which are problems for the independent base station configuration, are little problems for the RRE configuration and it is relatively easy to make high-speed control of radio resources between cells. Accordingly, in the RRE configuration, it is possible to apply the method using high-speed inter-cell signal processing such as plural-cell synchronous transmission on the downlink.

In the configuration illustrated in FIG. 2B, each of radio base station apparatuses eNB (or RRE) makes a control of allocation of radio resources such as scheduling. In this case, inter-cell coordination is performed by transmitting timing information and radio resource allocation information such as scheduling, when necessary, via an X2 interface between the radio base station apparatus eNB of the cell 1 and the radio base station apparatus eNB of the cell 2, to either of the radio base station apparatuses.

Next description is made about the MIMO technique.

Figure 3:
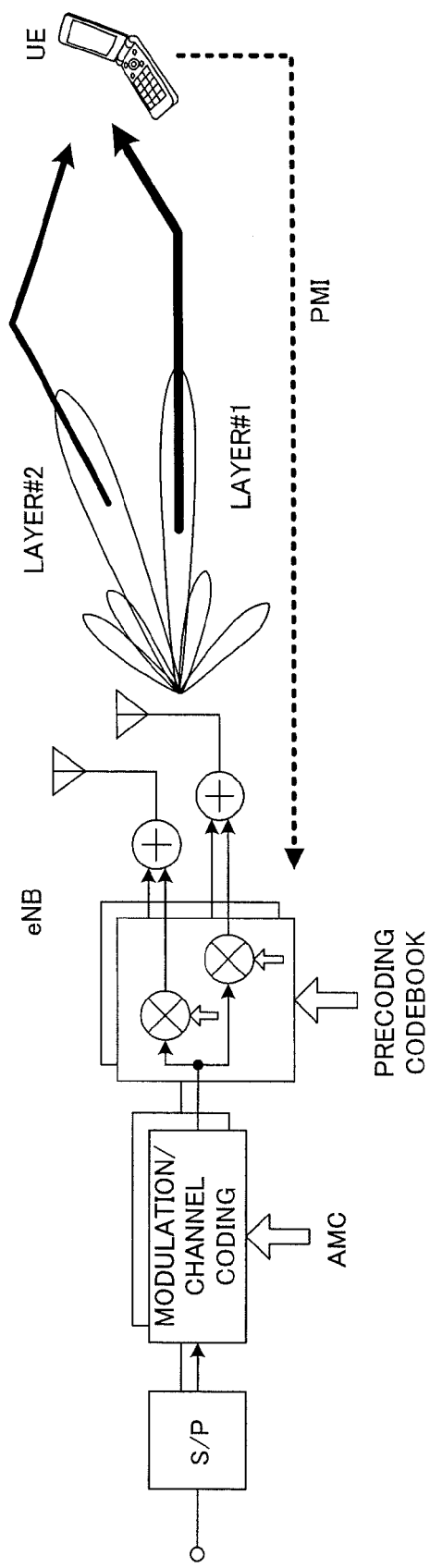
FIG. 3 is a diagram for explaining the MIMO technique.

In precoding in downlink MIMO transmission of the MIMO system illustrated in FIG. 3, a mobile terminal apparatus UE measures channel variances using reception signals from respective antennas, uses the measured channel variances as a basis to select a RI (Rank Indicator) and a PMI (Precoding Matrix Indicator) in accordance with such phase/amplitude control amounts (precoding weights) as to maximize a throughput (or reception SINR (Signal to Interference and Noise Ratio)) of combined transmission data from transmission antennas of the radio base station apparatus eNB. Then, the selected PMI and RI are fed, with channel quality information CQI (Channel Quality Indicator), back to the radio base station apparatus eNB on the uplink. In the radio base station apparatus eNB, a transmission signal is subjected to channel coding and data modulation (AMC: Adaptive Modulation and Coding) and then, the transmission data is subjected to precoding based on the PMI and RI fed back from the mobile terminal apparatus UE. With this processing, phase/amplitude is controlled (shifted) per transmission antenna. After that, the phase/amplitude shifted transmission data is transmitted from each antenna.

When performing precoding, a precoding weight corresponding to the PMI is selected from a codebook and the precoding weight is multiplied with a transmission signal. Here, the codebook includes a 2-transmission antennas codebook having 4/3 precoding matrixes for the ranks 1, 2, a 4-transmission antennas codebook having 16 precoding matrixes for the ranks 1, 2, 3 and 4, and an 8-transmission antennas codebook having a long-period/wideband codebook and a short-period/subband codebook.

As described above, in the case where both of the CoMP technique and the MIMO technique are employed, the mobile terminal apparatus UE needs to feed channel information (PMI) of each cell back to the radio base station apparatus of the cell. For example, when each of the two radio base station apparatuses eNB has 2 transmission antennas, the mobile terminal apparatus UE needs to feed PMIs of the two transmission antennas back to the two cells. In this case, as phase difference information between cells (inter-cell phase difference information) is not known, joint processing type CoMP transmission may not operate well (when CoMP is applied, the application effect may become small).

The present inventors have found that if the mobile terminal apparatus UE feeds the inter-cell phase difference information (cell selection information, when necessary) with channel information of the respective cells back to the radio base station apparatuses eNB of the respective cells, it is possible to enhance the application effect of join processing type CoMP transmission, even when employing the MIMO technique, and finally completed the present invention.

That is, the gist of the present invention is that a mobile terminal apparatus estimates a phase difference between cells based on channel states of downlink signals or PMIs selected using a codebook based on the channel states, and transmits information of the phase difference and the selected PMIs to radio base station apparatuses of the cells, and a radio base station apparatus multiplies a transmission signal by a precoding weight corresponding to a corresponding PMI, uses the information of the phase difference between the cells as a basis to adjust the phase difference between the cells and transmits the transmission signal to the radio base station apparatus of another cell by coordinated multi-point transmission.

In the present invention, the mobile terminal apparatus UE feeds the channel information (CQIs, PMIs) of the respective cells as well as the inter-cell phase difference information back to the radio base station apparatuses eNB. In this case, in the mobile terminal apparatus UE, reference signals included in downlink signals from plural cells are used to estimate downlink channel states, PMIs are selected from a codebook based on the respective channel states, and the selected PMIs of the cells and the channel states are used to estimate a phase difference between the cells. Then, information of this phase difference and the selected PMIs are transmitted to the radio base station apparatuses eNB of the plural cells. Note that the inter-cell phase difference can be obtained by calculation of the phase difference information from the channel states or PMIs for the respective cells.

Figure 4A:
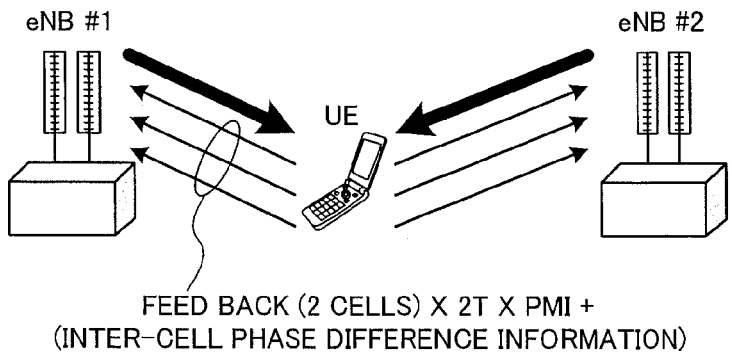
FIGS. 4A to 4C are diagrams each for explaining a radio communication method according to an embodiment of the present invention.

For example, assuming that each of two radio base station apparatuses eNB has two transmission antennas as illustrated in FIG. 4A, the mobile terminal apparatus UE feeds PMIs of the two transmission antennas and the information of phase difference between the two cells back to the radio base station apparatuses eNB. In a radio base station apparatus eNB, the information of phase difference between the cells is used to adjust the phase difference between the cells. For example, in user scheduling control, the phase difference between cells is adjusted using the information of phase difference between the cells and radio resources are allocated between the cells. With this structure, even when the MIMO technique is applied, it is possible to enhance the application effect of the joint processing type CoMP transmission.

Besides, in the present invention, the mobile terminal apparatus UE feeds channel information (CQIs, PMIs) of respective cells and information of phase difference between the cells and cell selection information to the radio base station apparatuses eNB. In this case, in the mobile terminal apparatus UE, as described above, the information of phase difference and PMIs are obtained, and reception quality of the downlink signals from the cells is measured and the measured reception quality is used to select a connection cell. Then, this information of phase difference, the selected PMIs and the cell selection information are transmitted to the radio base station apparatuses eNB of the cells.

Figure 4B:
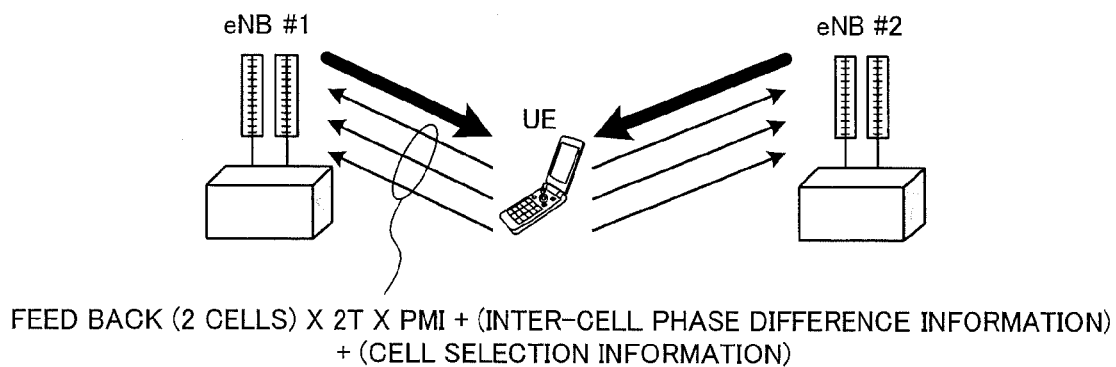

For example, as illustrated in FIG. 4B, when each of two radio base station apparatuses has two transmission antennas, the mobile terminal apparatus UE feeds PMIs of the two transmission antennas for the two cells and the inter-cell phase difference information and the cell selection information back to the radio base station apparatuses eNB. In a radio base station apparatus eNB, the inter-cell phase difference information and the cell selection information are used to adjust the phase difference between the cells and/or select a cell. For example, in user scheduling control, the inter-cell phase difference information is used to adjust a phase difference between the cells and/or select a cell based on the cell selection information thereby to allocate radio resources between the cells. With this configuration, even when the MIMO technique is applied, it is possible to enhance the application effect of the joint processing type CoMP transmission. This method is useful for the dynamic cell selection type CoMP transmission.

When the inter-cell phase difference information and cell selection information are fed back, the inter-cell phase difference information and the cell selection information may be quantized together to be fed back, or the inter-cell phase difference information and cell selection information may be fed back separately.

When the inter-cell phase difference information and the cell selection information are quantized together to be fed back, only information indicative of a cell other than the connection cell (the radio base station apparatus eNB#2 in FIG. 4B) is fed back as the cell selection information. For example, as illustrated in FIG. 5A, the information indicative of a phase difference is 60°, 120° and 180°, and the cell selection information is the radio base station apparatus eNB#2, which are quantized together. In may be configured that a plurality of binary codes (00, 01, 10, 11) formed with fixed bits (for example, two bits), phase difference information (60°), (120°) and) (180° and the cell selection information (eNB#2) are associated with each other and the phase difference information and the cell selection information are converted to any binary code. That is, when the phase difference 60° is "00", the phase difference 120° is "01", the phase difference 180° is "10" and the cell radio base station apparatus eNB#2 is "11". In the radio base station apparatus eNB having received such quantized information, when the bits are "00", "01" or "10", joint transmission type CoMP transmission is performed. That is, the phase difference information is used to adjust a phase difference between the cells, thereby to perform scheduling control of the radio resources. When the bits are "11", dynamic cell selection type CoMP transmission is performed. That is, the cell selection information is used to select a cell, thereby to perform scheduling control of the radio resources. By adopting such a feedback method, it is possible to reduce a feedback amount.

When the inter-cell phase difference information and the cell selection information are fed back separately, information indicative of a connection cell (the radio base station apparatus eNB#1 in FIG. 4B) and information indicative of a cell other than the connection cell (the radio base station apparatus eNB#2 in FIG. 4B) are fed back as the cell selection information. For example, as illustrated in FIG. 5B, the information indicative of the phase difference is 60°, 120°, 180°, 240° and the cell selection information is the radio base station apparatus eNB#1, the radio base station apparatus eNB#2, which are both quantized. That is, the phase difference 60° is "00", the phase difference 120° is "01", the phase difference 180° is "10" and the phase difference 240° is "11". And, another bit is used to indicate the cell radio base station apparatus eNB#1 by "0" and the cell radio base station apparatus eNB#2 by "1". When receiving the thus quantized information, the radio base station apparatus eNB performs joint transmission type CoMP transmission and dynamic cell selection type CoMP transmission, using the bits "00", "01", "10", "11" indicative of the phase difference and the bit "0", "1" indicative of the cell selection. That is, the phase difference information is used to adjust a phase difference between the cells thereby to perform scheduling control of radio resources and the cell selection information is used to select a cell thereby to perform scheduling control of radio resources.

When selecting a connection cell, it is determined based on measurement results of reception quality of downlink signals from plural cells. For example, when reception power from the radio base station apparatus eNB#2 is greater than the reception power from the radio base station apparatus eNB#1, the cell radio base station apparatus eNB#2 is selected. Used as reception quality may be reception power or reception signal to interference radio and noise to power ratio (reception SINR).

Figure 4C:
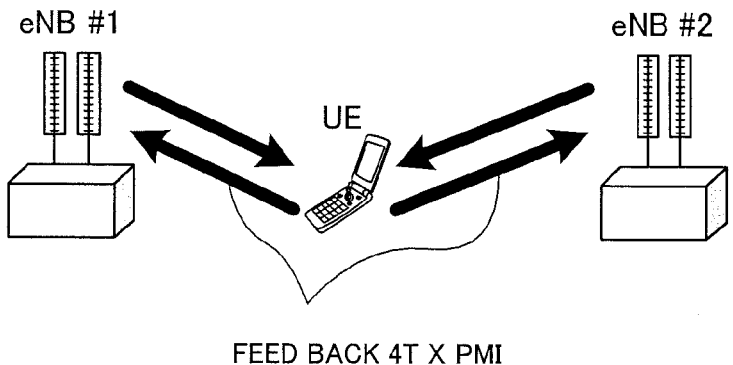

And, in the present invention, when the total number of antennas of the radio base station apparatuses eNB of plural cells is larger than the number of antennas supported by the codebook, another codebook to support more antennas is used. Then, the mobile terminal apparatus UE transmits PMIs selected using the codebook, to the radio base station apparatuses eNB. That is, channel information of the plural cells (PMIs) is feedback together (see FIG. 4C). For example, when each of the two radio base station apparatuses eNB has two transmission antennas, the fed-back PMIs are those for four transmission antennas. In each radio base station apparatus eNB, a precoding weight is generated which is obtained using a codebook to support more antennas than the antennas the own apparatus, and this precoding weight is multiplied with the transmission signal. When receiving such feedback information, the radio base station apparatus eNB performs CoMP transmission using PMIs of four transmission antennas. With this structure, the two radio base station apparatuses eNB physically separated from each other can be virtually regarded as one radio base station apparatus and CoMP transmission can be conducted in consideration of the channel states between the plural radio base station apparatuses and the mobile terminal apparatus.

EMBODIMENTS

Figure 6:
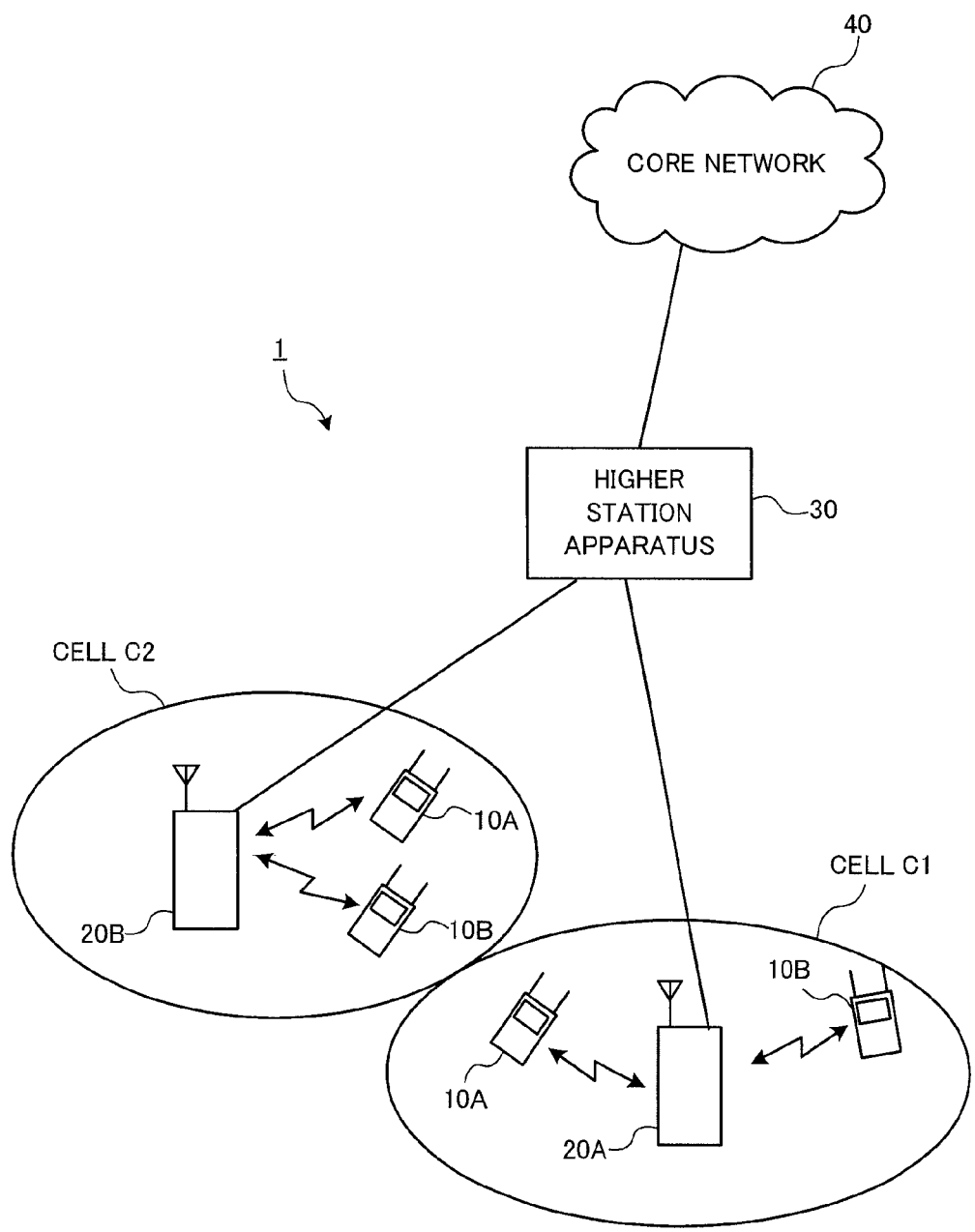
FIG. 6 is a diagram for explaining a system configuration of a radio communication system.

Here, description is made in detail about a radio communication system according to an embodiment of the present invention. FIG. 6 is a diagram for explaining a system configuration of the radio communication system according to the present embodiment. Here, the radio communication system illustrated in FIG. 6 is, for example, an LTE system or a system including SUPER 3G. In this radio communication system, carrier aggregation is used such that plural fundamental frequency blocks are aggregated into one band, each fundamental frequency block corresponding to the system band of the LTE system. Besides, this radio communication system may be called IMT-Advanced or 4G.

As illustrated in FIG. 6, the radio communication system 1 has base station apparatuses 20A and 20B and a plurality of first or second mobile terminal apparatuses 10A and 10B which communicate with the radio base station apparatuses 20A and 20B. The radio base station apparatuses 20A and 20B are connected to a higher station apparatus 30, which is connected to a core network 40. The radio base station apparatuses 20A and 20B are connected to each other by wire connection or wireless connection. The first and second mobile terminal apparatuses 10A and 10B can communicate with the radio base station apparatuses 20A and 20B in the cells C1 and C2, respectively. The higher station apparatus 30 includes, for example, an access gateway apparatus, a radio network controller (RNC), a mobility management entity (MME) and so on, but is by no means limited to these.

The first and second mobile terminal apparatuses 10A and 10B include LTE terminals and LTE-A terminals. In the following description, these are treated collectively as first and second mobile terminal apparatuses, unless specified otherwise. Besides, for convenience of explanation, it is assumed that it is the first and second mobile terminal apparatuses 10A and 10B that perform radio communications with the radio base station apparatuses 20A and 20B, but more generally, the mobile terminal apparatus may be user equipment (UE) including a mobile terminal apparatus and a fixed terminal apparatus.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to perform communications by dividing, per terminal, the system band into bands formed with one or continuous resource blocks, and allowing a plurality of terminals to use mutually different bands thereby to reduce interference between terminals.

Here, description is made about a communication channel.

Downlink communication channels include a PDSCH (Physical Downlink Shared CHannel) as a downlink data channel used by the first and second mobile terminal apparatuses 10A and 10B on a shared basis and a downlink L1/L2 control channel (PDCCH, PCFICH, PHICH). PDSCH is used to transmit transmission data and higher control information. PDCCH (Physical Downlink Control CHannel) is used to transmit scheduling information of PUSCH and PDSCH and so on. PCFICH (Physical Control Format Indicator CHannel) is used to transmit the number of OFDM symbols used in PDCCH. PHICH (Physical Hybrid-ARQ Indicator CHannel) is used to transmit ACK/NACK of HARQ for PUSCH.

The uplink communication channels include a PUSCH (Physical Uplink Shared CHannel), which is an uplink data channel used by each mobile terminal apparatus on a shared basis, and a PUCCH (Physical Uplink Control CHannel), which is an uplink control channel. This PUSCH is used to transmit transmission data and higher control information.

Furthermore, the PUCCH is used to transmit downlink radio quality information (CQI: Channel Quality Indicator), ACK/NACK, and so on.

Figure 7:
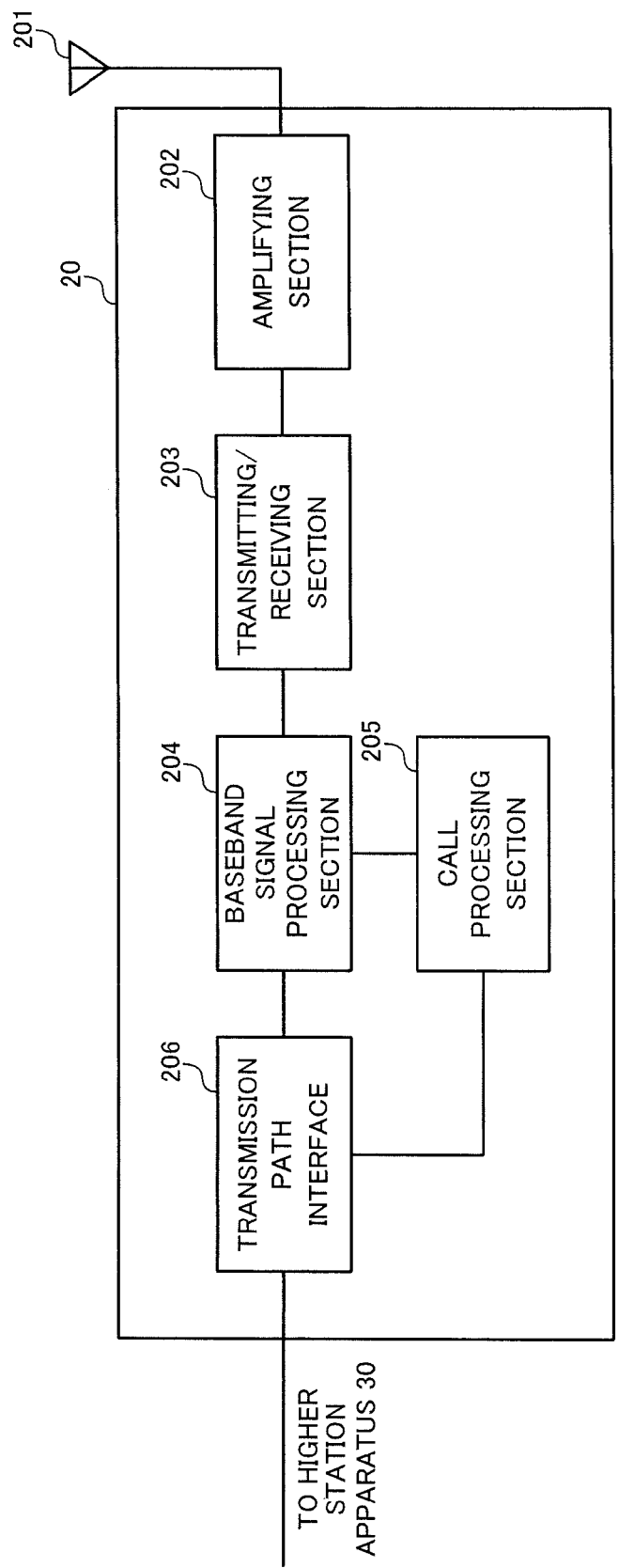
FIG. 7 is a diagram for explaining an overall configuration of a radio base station apparatus.

With reference to FIG. 7, an overall configuration of the radio base station apparatus according to the present embodiment will be described. Here, as the radio base station apparatuses 20A and 20B are the same in structure, they are treated collectively as a radio base station apparatus 20. And, as the first and second mobile terminal apparatuses 10A and 10B are also the same in structure, they are treated collectively as a mobile terminal apparatus 10. The radio base station apparatus 20 has a transmitting/receiving antenna 201, an amplifying section 202, a transmitting/receiving section (notifying section) 203, a baseband signal processing section 204, a call processing section 205 and a transmission path interface 206. Transmission data that is transmitted on the downlink from the radio base station apparatus 20 to the mobile terminal apparatus is input into the baseband signal processing section 204, through the transmission path interface 206, from the higher station apparatus 30.

In the baseband signal processing section 204, a downlink data channel signal is subjected to PDCP layer processing, RLC (Radio Link Control) layer transmission processing such as RLC retransmission control transmission processing and division and coupling of transmission data, MAC (Medium Access Control) retransmission control, including, for example, HARQ transmission processing, scheduling, transport format selection, channel coding, inverse fast Fourier transform (IFFT) processing, and precoding processing. Furthermore, as with signals of the physical downlink control channel, which is a downlink control channel, transmission processing is performed, including channel coding and inverse fast Fourier transform.

Also, the baseband signal processing section 204 notifies the mobile terminal apparatuses 10 connected to the same cell of control information for allowing each of the mobile terminal apparatuses 10 to wirelessly communicate with the radio base station apparatus 20, by a broadcast channel. Information for communication in this cell includes, for example, the uplink or downlink system bandwidth, identification information of a root sequence (root sequence index) for generating random access preamble signals in the PRACH (Physical Random Access CHannel), and so on.

In the transmitting/receiving section 203, the baseband signal output from the baseband signal processing section 204 is subjected to frequency conversion processing into a radio frequency band. The amplifying section 202 amplifies the radio-frequency signal having been subjected to frequency conversion, and outputs the result to the transmitting/receiving antenna 201. Here, the transmitting/receiving section 203 constitutes a receiving section for receiving uplink signals including phase difference information between cells and PMIs and a transmitting section for transmitting transmission signals by coordinated multi-point transmission.

Meanwhile, as for signals to be transmitted on the uplink from the mobile terminal apparatus 10 to the radio base station apparatus 20, a radio frequency signal that is received in the transmitting/receiving antenna 201 is amplified in the amplifying section 202, subjected to frequency conversion and converted into a baseband signal in the transmitting/receiving section 203, and is input to the baseband signal processing section 204.

The baseband signal processing section 204 performs FFt processing, IDFT processing, error correction decoding, MAC retransmission control reception processing, and RLC layer and PDCP layer reception processing on the transmission data included in the baseband signal that is received on the uplink. The decoded signal is transferred to the higher station apparatus 30 through the transmission path interface 206.

The call processing section 205 performs call processing such as setting up and releasing a communication channel, manages the state of the radio base station apparatus 20 and manages the radio resources.

Figure 8:
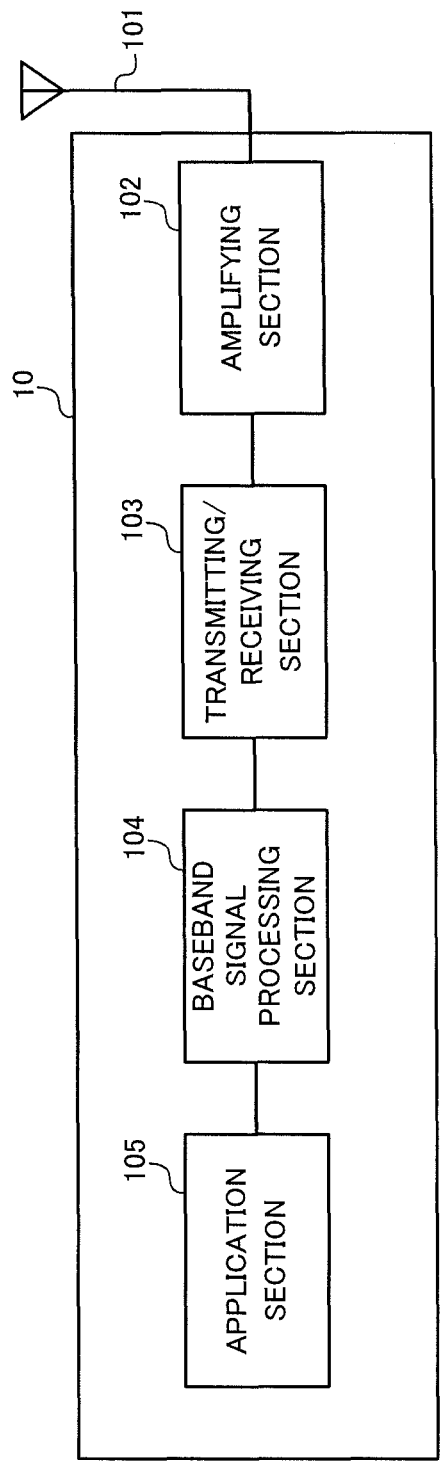
FIG. 8 is a diagram for explaining an overall configuration of a mobile terminal apparatus.

Next, referring to FIG. 8, an overall configuration of the mobile terminal apparatus according to the present embodiment will be described. An LTE terminal and an LTE-A terminal have the same hardware configurations in the principle parts, and will be described without distinction. The mobile terminal apparatus 10 has a transmitting/receiving antenna 101, an amplifying section 102, a transmitting/receiving section (receiving section) 103, a baseband signal processing section 104 and an application section 105.

As for downlink data, a radio frequency signal received in the transmitting/receiving antenna 101 is amplified in the amplifying section 102, and subjected to frequency conversion and converted into a baseband signal in the transmission/reception section 103. This baseband signal is subjected to reception processing such as FFT processing, error correction decoding and retransmission control and so on, in the baseband signal processing section 104. In this downlink data, downlink transmission data is transferred the application section 105. The application section 105 performs processing related to higher layers above the physical layer and the MAC layer. In the downlink data, broadcast information is also transferred to the application section 105.

Uplink transmission data is input from the application section 105 to the baseband signal processing section 104. In the baseband signal processing section 104, mapping processing, retransmission control (HARQ) transmission processing, channel coding, DFT processing, and IFFT processing are performed. The baseband signal output from the baseband signal processing section 104 is subjected to frequency conversion processing in the transmitting/receiving section 103 and converted into a radio frequency band, and, after that, the frequency-converted radio frequency signal is amplified in the amplifying section 102 and transmitted from the transmitting/receiving antenna 101. Here, the transmitting/receiving section 103 constitutes a transmitting section for transmitting phase difference information, connection cell information, selected PMIs and so on to radio base station apparatuses eNB of plural cells and a receiving section for receiving downlink signals.

Figure 9:
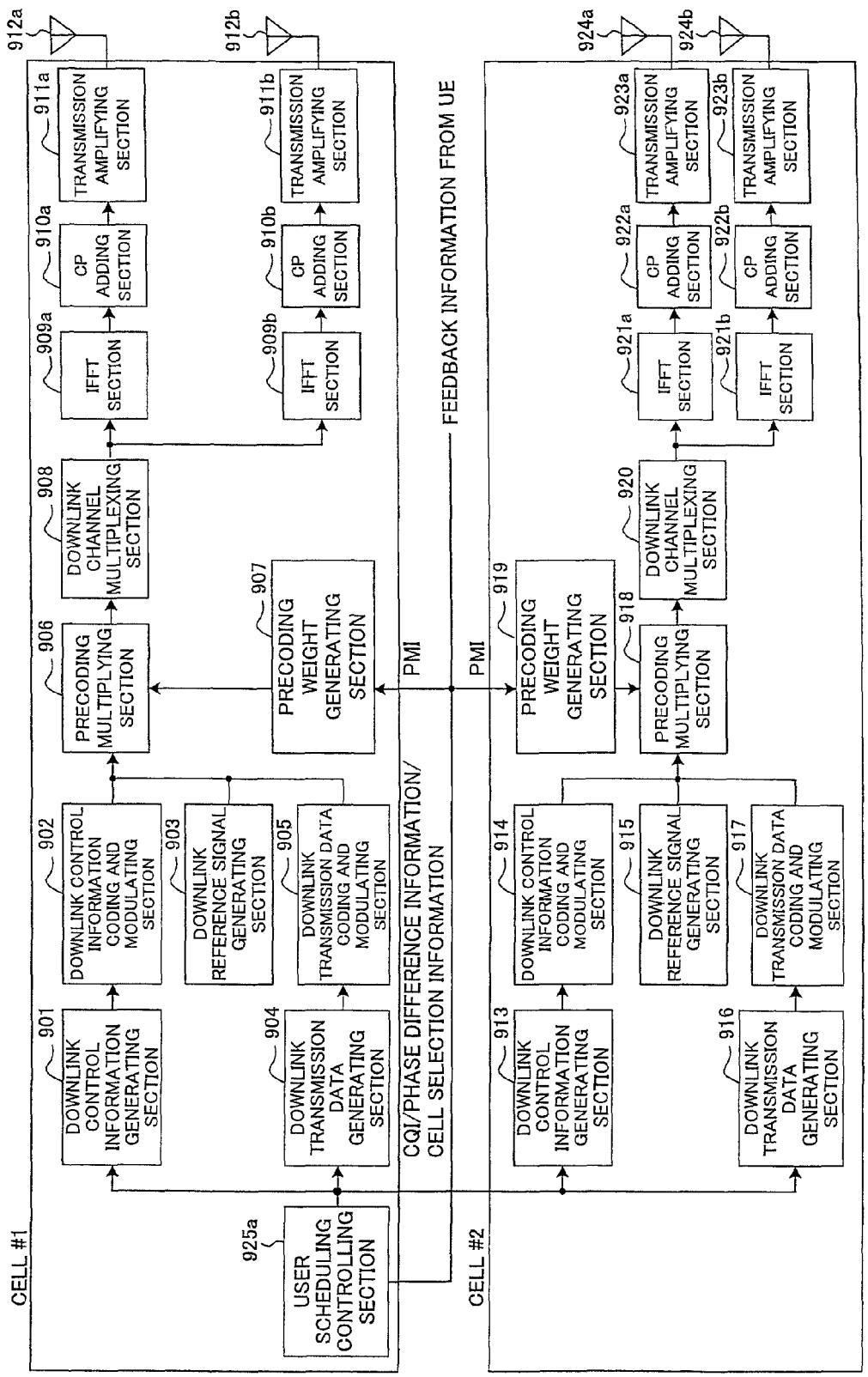
FIG. 9 is a functional block diagram of a baseband processing section of a centralized control type radio base station apparatus.

With reference to FIG. 9, description is made about functional blocks of the radio base station apparatus. The radio base station apparatus illustrated in FIG. 9 has a centralized control type radio base station configuration. In the case of the centralized control type, a certain radio base station apparatus eNB (centralized radio base station apparatus eNB, cell #1 in FIG. 9) makes a centralized control of radio resource allocation such as scheduling and a cell under control (cell #2 in FIG. 9) follows results of radio resource allocation by the centralized radio base station apparatus eNB. In this case, the fed-back phase difference information and cell selection information are used as information required for radio resource allocation between cells in a user scheduling controlling section of the centralized radio base station apparatus eNB.

Here, the functional blocks shown in FIG. 9 represent processing substantially performed in the baseband processing section. And, the functional blocks shown in FIG. 9 are simplified, and needless to say, the baseband processing section is equipped with standard parts.

The transmitting section of the centralized radio base station apparatus eNB (cell #1) has a downlink control information generating section 901, a downlink control information coding and modulating section 902, a downlink reference signal generating section 903, a downlink transmission data generating section 904, a downlink transmission data coding and modulating section 905, a precoding multiplying section 906, a precoding weight generating section 907, a downlink channel multiplexing section 908, IFFT sections 909a and 909b, CP adding sections 910a and 910b, transmission amplifying sections 911a and 911b, transmitting antennas 912a and 912b and a user scheduling controlling section 925.

In the meantime, the transmitting section of the radio base station apparatus eNB (cell #2) of a cell under control has a downlink control information generating section 913, a downlink control information coding and modulating section 914, a downlink reference signal generating section 915, a downlink transmission data generating section 916, a downlink transmission data coding and modulating section 917, a precoding multiplying section 918, a precoding weight generating section 919, a downlink channel multiplexing section 920, IFFT sections 921a and 921b, CP adding sections 922a and 922b, transmission amplifying sections 923a and 923b, and transmitting antennas 924a and 924b. The centralized radio base station apparatus eNB and the radio base station apparatus eNB of a cell under control thereof are connected by an optical fiber.

The downlink control information generating sections 901 and 913 generate downlink control information and output the downlink control information to the downlink control information coding and modulating sections 902 and 914, respectively. The downlink control information coding and modulating sections 902 and 914 perform channel coding and data modulation on the downlink control information and output the resultant to the precoding multiplying sections 906 and 918, respectively.

The downlink reference signal generating sections 903 and 915 generate downlink reference signals (CRSs (Common Reference Signals), CSI-RSs (Channel Information State-Reference Signals) and DM-RSs (Demodulation-Reference Signals)) and output the downlink reference signals to the precoding multiplying sections 906 and 918, respectively.

The downlink transmission data generating sections 904 and 916 generate downlink transmission data and output the downlink transmission data to the downlink transmission data coding and modulating sections 905 and 917, respectively. The downlink transmission data coding and modulating sections 905 and 917 perform channel coding and data modulation on the downlink transmission data and output the resultant to the precoding multiplying sections 906 and 918, respectively.

The downlink control information generating sections 901 and 913 generate downlink control information by control of the user scheduling controlling section 925. Then, the user scheduling controlling section 925 performs scheduling control of the downlink control information using phase difference information between cells and CQIs (Channel Quality Indicators) from the mobile terminal apparatus UE. In other words, the user scheduling controlling section 925 adjusts a phase difference between the cells using the inter-cell phase difference information and makes scheduling control of the downlink control information so as to allow CoMP transmission in the cells #1 and #2 (to allow CoMP transmission with the radio base station apparatus eNB of another cell).

When an uplink signal includes information of a connection cell (cell selection information), that is, when the feedback information includes cell selection information, the user scheduling controlling section 925 makes scheduling control of the downlink control information using the cell selection information and CQIs from the mobile terminal apparatus UE. That is, the user scheduling controlling section 925 makes scheduling control of the downlink control information so as to be able to select a cell to perform CoMP transmission based on the cell selection information.

In the same manner as described above, the downlink transmission data generating sections 904 and 916 generate downlink transmission data by control of the user scheduling controlling section 925. Then, the user scheduling controlling section 925 makes scheduling control of the downlink transmission data using the inter-cell phase difference information and CQIs from the mobile terminal apparatus UE. In other words, the user scheduling controlling section 925 adjusts a phase difference between the cells using the inter-cell phase difference information and makes scheduling control of the downlink transmission data so as to allow CoMP transmission in the cells #1 and #2 (to allow CoMP transmission with the radio base station apparatus eNB of another cell).

And, when the feedback information includes the cell selection information, the user scheduling controlling section 925 makes scheduling control of downlink transmission data using the cell selection information and CQIs from the mobile terminal apparatus UE. That is, the user scheduling controlling section 925 makes scheduling control of downlink transmission data so as to select a cell to perform CoMP transmission based on the cell selection information.

In this way, the user scheduling controlling section 925 acts as a phase difference adjusting section for adjusting a phase difference between cells using phase difference information between the cells. As the phase difference between the cells is thus adjusted, it is possible to make the most of the effect of the joint transmission type CoMP transmission, even when employing the MIMO technique. And, when the feedback information includes the cell selection information, the user scheduling controlling section 925 acts as a section for selecting a cell to perform CoMP transmission based on the cell selection information. With this selection of the cell, it is possible to make the most of the effect of the dynamic cell selection type CoMP transmission, even when employing the MIMO technique.

The precoding weight generating sections 907 and 919 generate precoding weights, using codebooks, based on PMIs given as feedback from the mobile terminal apparatus UE. The precoding weight generating sections 907 and 919 output the precoding weights to the precoding multiplying sections 906 and 918, respectively.

The precoding weight generating sections 907 and 919 have respective codebooks and select precoding weights corresponding to the PMIs from the respective codebooks. Note that when the total number of antennas of radio base station apparatuses eNB of plural cells is greater than the number of antennas supported by a codebook, another codebook to support more antennas is used. For example, when each of two radio base station apparatuses eNB has two transmission antennas, PMIs for four transmission antennas are given as feedback.

The precoding multiplying sections 906 and 918 multiply transmission signals by precoding weights corresponding to the PMIs. In other words, the precoding multiplying sections 906 and 918 use as a basis the precoding weights received as input from the precoding weight generating sections 907 and 919 to perform phase shift and/or amplitude shift on transmission signals (downlink control information, downlink reference signals, downlink transmission data) for the transmitting antennas 924a and 924, separately (weighting on the transmitting antennas by precoding). The precoding multiplying sections 906 and 918 output the phase-shifted and/or amplitude-shifted transmission signals to the downlink channel multiplexing sections 908 and 920, respectively.

The downlink channel multiplexing sections 908 and 920 combine the phase-shifted and/or amplitude-shifted downlink control information, downlink reference signals and downlink transmission data to generate transmission signals for the transmitting antennas 912a, 912b and the transmitting antennas 924a, 924b, separately. The downlink channel multiplexing sections 908 and 920 output these transmission signals to the IFFT (Inverse Fast Fourier Transform) sections 909a, 909b and the IFFT sections 921a, 921b, respectively.

The IFFT sections 909a, 909b and the IFFT sections 921a, 921b perform IFFT on the transmission signals and output the transmission signals having been subjected to IFFT, to the CP adding sections 910a, 910b and the CP adding sections 922a, 922b. The CP adding sections 910a, 910b and the CP adding sections 922a, 922b add CPs (Cyclic Prefixes) to the transmission signals having been subjected to IFFT, and output the CP-added transmission signals to the transmission amplifying sections 911a, 911b and the transmission amplifying sections 923a, 923b, respectively.

The transmission amplifying sections 911a, 911b and the transmission amplifying sections 923a, 923b amplify the CP-added transmission signals. The amplified transmission signals are transmitted on the downlink from the transmitting antennas 912a, 912b and the transmitting antennas 924a, 924b to the mobile terminal apparatus UE.

Figure 10:
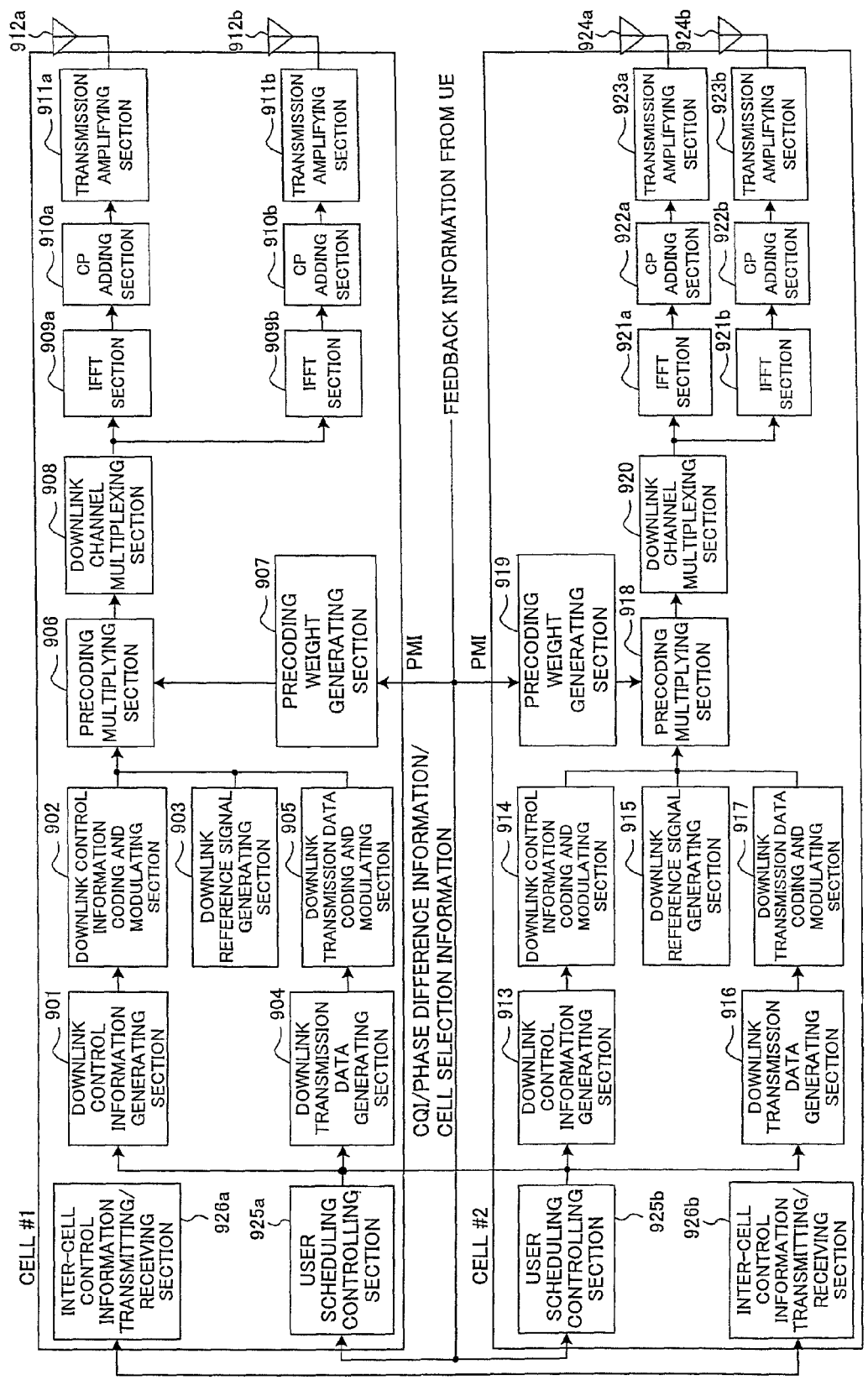
FIG. 10 is a functional block diagram of a baseband processing section of an autonomous distributed control type radio base station apparatus.

With reference to FIG. 10, functional blocks of the radio base station apparatus will be described below. The radio base station apparatus illustrated in FIG. 10 has an autonomous distributed control type radio base station configuration. In the case of the autonomous distributed control type, each of the plural radio base station apparatuses eNB (or RRE) makes control of radio resource allocation like scheduling. In this case, the phase difference information and cell selection information given as feedback are used as information required for allocation of radio resources in the user scheduling controlling sections of the radio base station apparatuses eNB.

Here, the functional blocks shown in FIG. 10 represent processing substantially performed in the baseband processing section. And, the functional blocks shown in FIG. 10 are simplified, and needless to say, the baseband processing section is equipped with standard parts. And, in FIG. 10, the same processing sections as those in FIG. 9 are indicated by the same reference numerals as those in FIG. 9 and their detailed explanation is omitted here.

The transmitting section at the cell #1 side has a downlink control information generating section 901, a downlink control information coding and modulating section 902, a downlink reference signal generating section 903, a downlink transmission data generating section 904, a downlink transmission data coding and modulating section 905, a precoding multiplying section 906, a precoding weight generating section 907, a downlink channel multiplexing section 908, IFFT sections 909a and 909b, CP adding sections 910a and 910b, transmission amplifying sections 911a and 911b, transmitting antennas 912a and 912b, a user scheduling controlling section 925a and an inter-cell control information transmitting/receiving section 926a.

The transmitting section at the cell #2 side has a downlink control information generating section 913, a downlink control information coding and modulating section 914, a downlink reference signal generating section 915, a downlink transmission data generating section 916, a downlink transmission data coding and modulating section 917, a precoding multiplying section 918, a precoding weight generating section 919, a downlink channel multiplexing section 920, IFFT sections 921a and 921b, CP adding sections 922a and 922b, transmission amplifying sections 923a and 923b, transmitting antennas 924a and 924b, a user scheduling controlling section 925b and an inter-cell control information transmitting/receiving section 926b.

The inter-cell control information transmitting/receiving sections 926a and 926b are connected to each other by an X2 interface. As they are thus connected, they are able to transmit/receive the inter-cell control information, thereby allowing coordination between cells. Control information transmitted or received via the X2 interface includes timing information, radio resource allocation information such as scheduling, and so on.

The downlink control information generating sections 901 and 913 generate downlink control information by control of the user scheduling controlling sections 925a and 925b. Then, the user scheduling controlling sections 925a and 925b perform scheduling control of the downlink control information using phase difference information between cells and CQIs (Channel Quality Indicators) from the mobile terminal apparatus UE. In other words, the user scheduling controlling sections 925a and 925b adjust a phase difference between the cells using the phase difference information between the cells and make scheduling control of the downlink control information so as to allow CoMP transmission in the cells #1 and #2 (to allow CoMP transmission with the radio base station apparatus eNB of the cell #2).

When an uplink signal includes information of a connection cell (cell selection information), that is, when the feedback information includes cell selection information, the user scheduling controlling sections 925a and 925b make scheduling control of the downlink control information using the cell selection information and CQIs from the mobile terminal apparatuses UE. That is, the user scheduling controlling sections 925a and 925b make scheduling control of the downlink control information so as to be able to select a cell to perform CoMP transmission based on the cell selection information.

In the same manner as described above, the downlink transmission data generating sections 904 and 916 generate downlink transmission data by control of the user scheduling controlling sections 925a and 925b, respectively. Then, the user scheduling controlling sections 925a and 925b make scheduling control of the downlink transmission data using the phase difference information between the cells and CQIs from the mobile terminal apparatus UE. In other words, the user scheduling controlling sections 925a and 925b adjust a phase difference between the cells using the phase difference information between the cells and make scheduling control of the downlink transmission data so as to allow CoMP transmission in the cells #1 and #2 (to allow CoMP transmission with the radio base station apparatus eNB of the cell #1).

And, when the feedback information includes the cell selection information, the user scheduling controlling sections 925a and 925b make scheduling control of downlink transmission data using the cell selection information and CQIs from the mobile terminal apparatus UE. That is, the user scheduling controlling sections 925a and 925b make scheduling control of downlink transmission data so as to select a cell to perform CoMP transmission based on the cell selection information.

In this way, the user scheduling controlling sections 925a and 925b each act as a phase difference adjusting section for adjusting a phase difference between cells using phase difference information between the cells. As the phase difference between the cells is thus adjusted, it is possible to make the most of the effect of the joint transmission type CoMP transmission, even when employing the MIMO technique. And, when the feedback information includes the cell selection information, the user scheduling controlling sections 925a and 925b each act as a section for selecting a cell to perform CoMP transmission based on the cell selection information. With this selection of the cell, it is possible to make the most of the effect of the dynamic cell selection type CoMP transmission, even when employing the MIMO technique.

Figure 11:
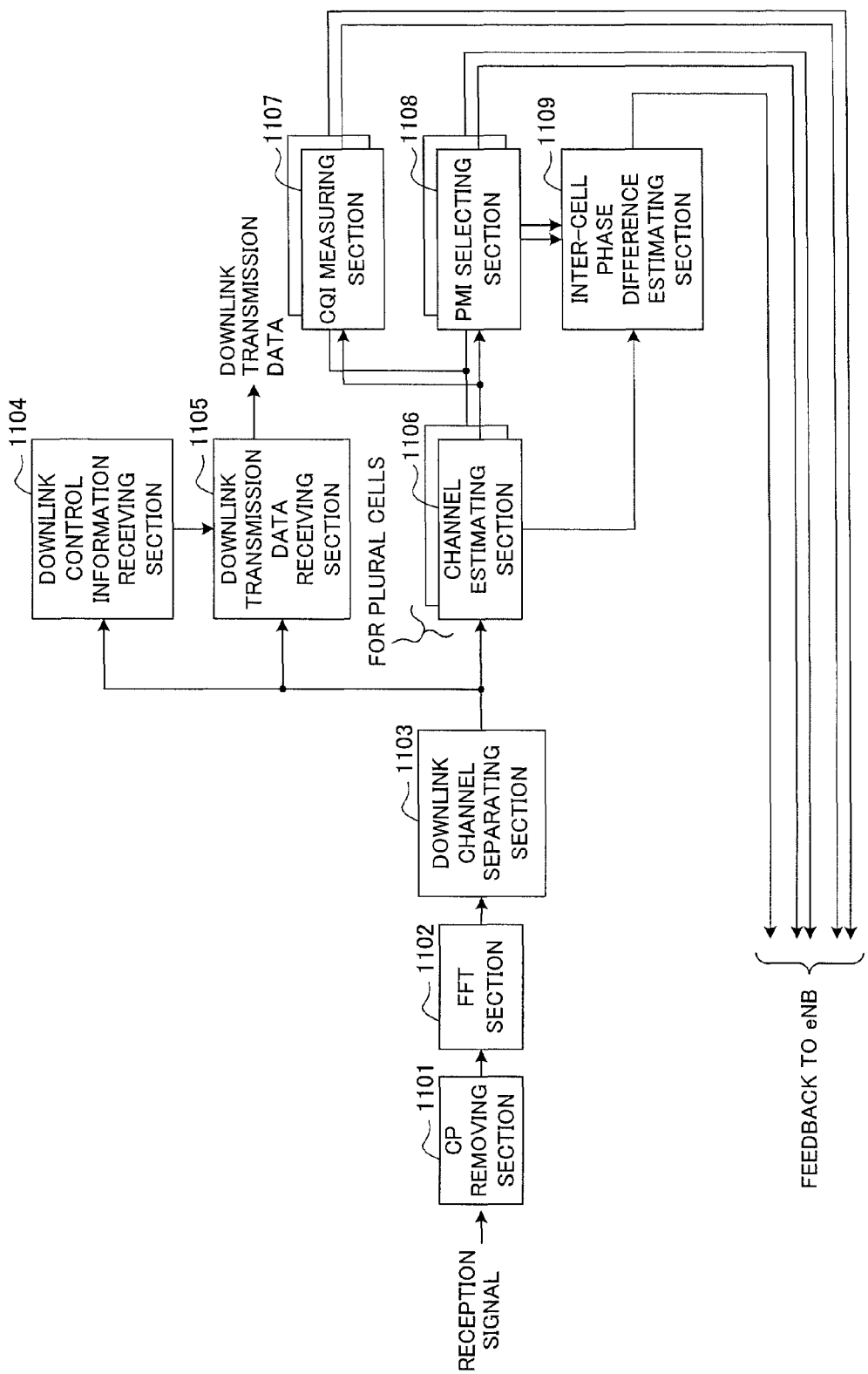
FIG. 11 is a functional block diagram of baseband processing section of a mobile terminal apparatus.

With reference to FIG. 11, functional blocks of the mobile terminal apparatus will be described below. Note that the functional blocks shown in FIG. 11 represent processing substantially performed in the baseband processing section. The functional blocks shown in FIG. 11 are simplified for explanation of the present invention, and needless to say, the baseband processing section is equipped with standard parts.

The receiving section of the mobile terminal apparatus UE has a CP removing section 1101, an FFT section 1102, a downlink channel separating section 1103, a downlink control information receiving section 1104, a downlink transmission data receiving section 1105, a channel estimating section 1106, a CQI measuring section 1107, a PMI selecting section 1108, and an inter-cell phase difference estimating section 1109.

A transmission signal transmitted from the radio base station apparatus eNB is received by an antenna and is output to the CP removing section 1101. The CP removing section 1101 removes CPs from the reception signal and outputs the resultant to the FFT (Fast Fourier Transform) section 1102. The FFT section 1102 performs Fourier transform on the CP-removed signal and converts the signal from a time-sequence signal to a frequency-domain signal. The FFT section 1102 outputs the converted frequency-domain signal to the downlink channel separating section 1103. The downlink channel separating section 1103 separates the downlink channel signal into downlink control information, downlink transmission data and a downlink reference signal. The downlink channel separating section 1103 outputs the downlink control information to the downlink control information receiving section 1104, outputs the downlink transmission data to the downlink transmission data receiving section 1105, and outputs the downlink reference signal to the channel estimating section 1106.

The downlink control information receiving section 1104 demodulates the downlink control information and outputs the demodulated control information to the downlink transmission data receiving section 1105. The downlink transmission data receiving section 1105 demodulates the downlink transmission data with use of the control information. The channel estimating section 1106 estimates a channel state with use of the downlink reference signal and outputs the estimated channel state to the CQI measuring section 1107, the PMI selecting section 1108 and the inter-cell phase difference estimating section 1109.

The CQI measuring section 1107 measures a CQI based on the channel state reported from the channel estimating section 1106. As the channel state is estimated per cell, the channel state per cell is used to measure a CQI per cell. The measured CQI per cell is transmitted as feedback information to the radio base station apparatuses eNB.

The PMI selecting section 1108 selects a PMI, using a codebook, based on the channel state reported from the channel estimating section 1106. As the channel state is estimated per cell, the channel state per cell is used to select a PMI per cell. The selected PMI is output to the inter-cell phase difference estimating section 1109 and is also transmitted to the radio base station apparatuses eNB as feedback information for single cell transmission.

The inter-cell phase difference estimating section 1109 estimates a phase difference between cells based on channel states reported from the channel estimating sections 1106 or selected PMIs. The inter-cell phase difference estimating section 1109 obtains phase difference information between cells by calculation based on the channel states or PMIs of the plural cells. The phase difference information between cells is transmitted as feedback information to the radio base station apparatuses eNB.

In the radio communication system having the above-described configuration, first, the channel estimating section 1106 of the mobile terminal apparatus UE estimates downlink channel states with use of reference signals included in downlink signals from plural cells. Then, the PMI selecting section 1108 selects PMIs for the respective cells based on the estimated channel states. After that, the inter-cell phase difference estimating section 1109 estimates a phase difference between cells based on the channel states or the selected PMIs. The PMIs of the respective cells and phase difference information are transmitted, with the CQIs of the respective cells, to the radio base station apparatuses eNB as feedback information. In the centralized control type configuration, the feedback information is transmitted to the centralized radio base station apparatus eNB and in the autonomous distributed control type configuration, the feedback information is transmitted to each of the radio base station apparatuses eNB.

The precoding multiplying sections 906 and 918 of the radio base station apparatuses multiply transmission signals by precoding weights corresponding to the PMIs. Then, the user scheduling controlling sections 925, 925a and 925b each use phase difference information between cells as a basis to adjust a phase difference between the cells and make scheduling control so as to allow CoMP transmission (Joint transmission) of transmission signals with the radio base station apparatus of another cell. With this radio communication method, it is possible to, when employing the MIMO technique and the CoMP technique, make the most of the effects of both of the techniques.

Modified Embodiment 1

Figure 12:
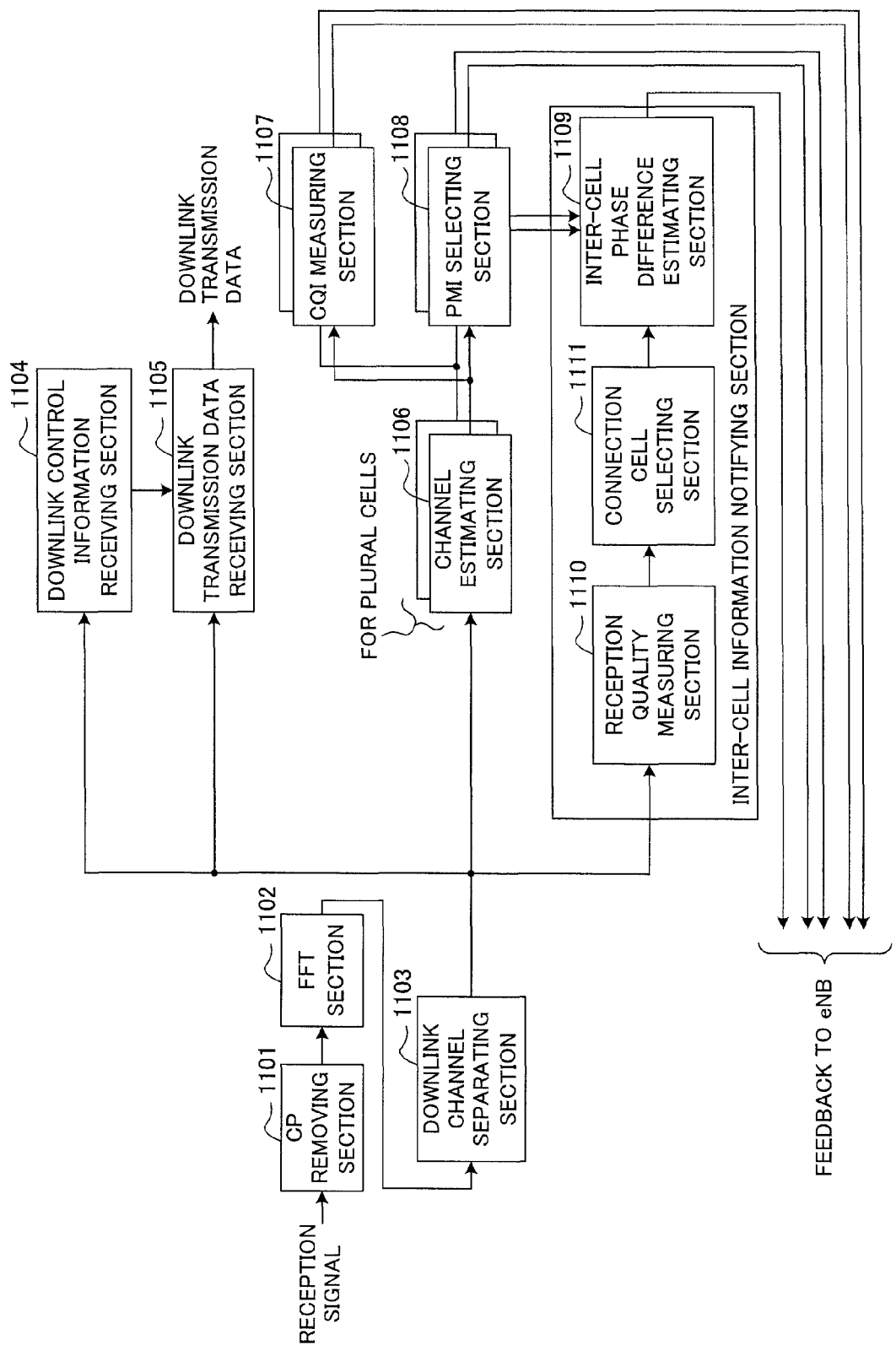
FIG. 12 is a functional block diagram of a baseband processing section of a mobile terminal apparatus according to a modified embodiment 1.

With reference to FIG. 12, functional blocks of the mobile terminal apparatus will be described below. Note that the functional blocks shown in FIG. 12 represent processing substantially performed in the baseband processing section. The functional blocks shown in FIG. 12 are simplified for explanation of the present invention, and needless to say, the baseband processing section is equipped with standard parts. Besides, in FIG. 12, the same parts as those in FIG. 11 are denoted by the same reference numerals as those in FIG. 11 and their detailed explanation is omitted here.

The receiving section of the mobile terminal apparatus UE has a CP removing section 1101, an FFT section 1102, a downlink channel separating section 1103, a downlink control information receiving section 1104, a downlink transmission data receiving section 1105, a channel estimating section 1106, a CQI measuring section 1107, a PMI selecting section 1108, an inter-cell phase difference estimating section 1109, a reception quality measuring section 1110 and a connection cell selecting section 1111. The inter-cell phase difference estimating section 1109, the reception quality measuring section 1110 and the connection cell selecting section 1111 constitute an inter-cell information notifying section.

The reception quality measuring section 1110 measures reception quality per cell using reception signals of the respective cells. Here, the reception quality is reception power or a reception signal to interference and noise power ratio. The reception quality measuring section 1110 outputs the measured reception quality per cell to the connection cell selecting section 1111. The connection cell selecting section 1111 selects a connection cell based on the measured reception quality per cell. The connection cell selecting section 1111 selects a cell of higher reception quality as a connection cell and outputs information of the cell (cell selection information: e.g., cell identification number) to the inter-cell phase difference estimating section 1109. This cell selection information is transmitted to the radio base station apparatuses eNB as feedback information.

The inter-cell phase difference estimating section 1109 estimate a phase difference between cells based on the channel states reported from the channel estimating section 1106 or the selected PMIs, and transmits the phase difference information as feedback information to the radio base station apparatuses eNB. Besides, the inter-cell phase difference estimating section 1109 quantizes the cell selection information and the phase difference information. At this time, as illustrated in FIG. 5A, the inter-cell phase difference information and the cell selection information may be quantized together or as illustrated in FIG. 5B, the inter-cell phase difference information and the cell selection information may be quantized separately.

In the radio communication system having the above-described configuration, first, the channel estimating section 1106 of the mobile terminal apparatus UE estimates downlink channel states with use of reference signals included in downlink signals from plural cells. Then, the PMI selecting section 1108 selects PMIs for the respective cells based on the estimated channel states. After that, the inter-cell phase difference estimating section 1109 estimates a phase difference between cells based on the channel states or the selected PMIs. In the meantime, the reception quality measuring section 1110 measures downlink reception quality of each of downlink signals from plural cells. Then, the connection cell selecting section 1111 selects a connection cell based on the measured reception quality. The PMIs for the respective cells, phase difference information and cell selection information are transmitted, with the CQIs of the respective cells, to the radio base station apparatuses eNB as feedback information. In the centralized control type configuration, the feedback information is transmitted to the centralized radio base station apparatus eNB and in the autonomous distributed control type configuration, the feedback information is transmitted to each of the radio base station apparatuses eNB.

The precoding multiplying sections 906 and 918 of the radio base station apparatuses multiply transmission signals by precoding weights corresponding to the PMIs. Then, the user scheduling controlling sections 925, 925*a* and 925*b* each use phase difference information between cells as a basis to adjust a phase difference between the cells and make scheduling control so as to allow CoMP transmission (Joint transmission) of transmission signals with the radio base station apparatus of another cell. Or, the user scheduling controlling section 925, 925*a* and 925*b* use the cell selection information as a basis to make scheduling control so as to allow CoMP transmission of transmission signals (Dynamic cell selection) with the radio base station apparatus of another cell. With this radio communication method, it is possible to, when employing the MIMO technique and the CoMP technique, make the most of the effects of both of the techniques.

Modified Embodiment 2

Figure 13:
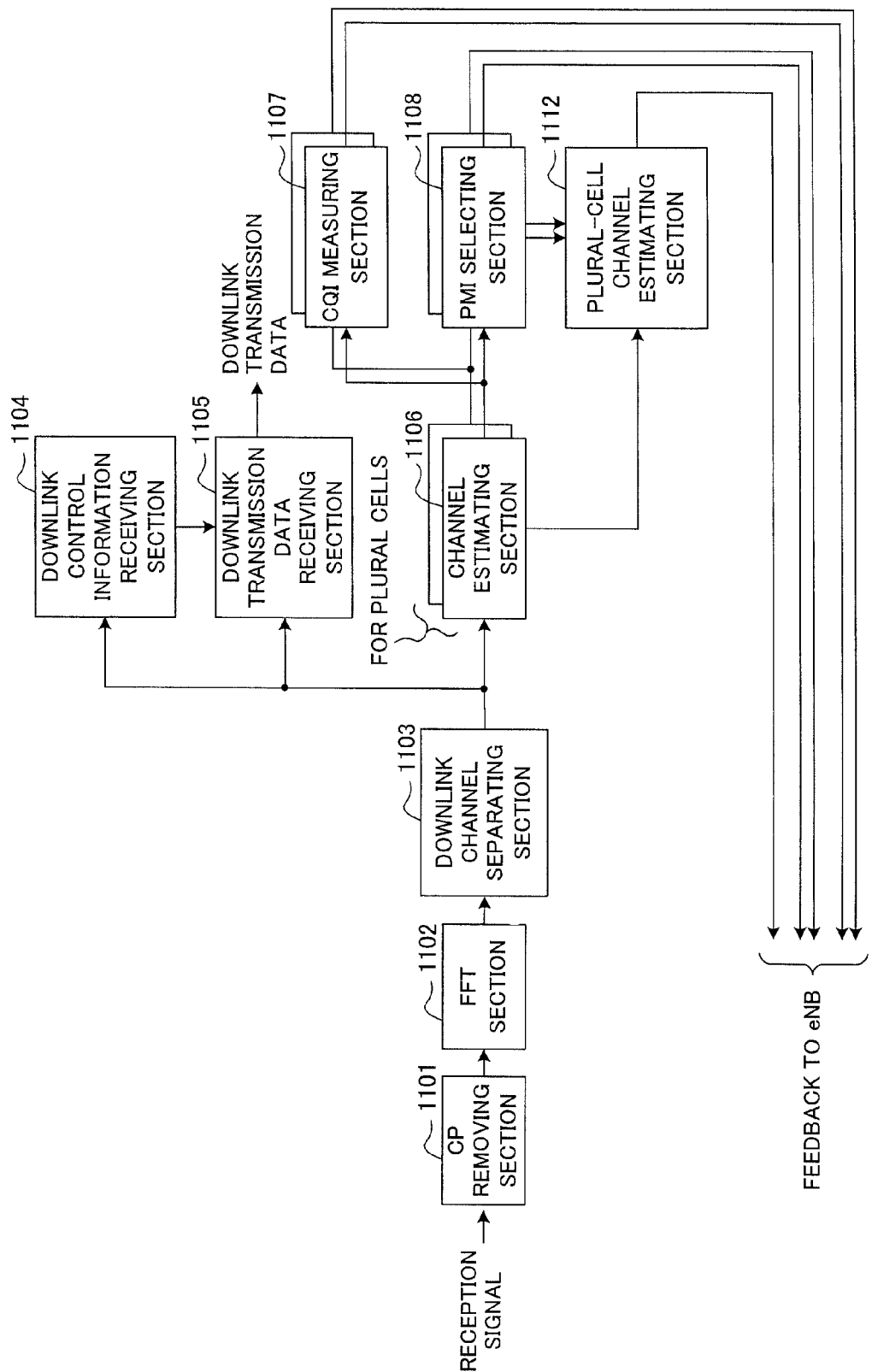
FIG. 13 is a functional block diagram of a baseband processing section of a mobile terminal apparatus according to a modified embodiment 2.

With reference to FIG. 13, functional blocks of the mobile terminal apparatus will be described below. Note that the functional blocks shown in FIG. 13 represent processing substantially performed in the baseband processing section. The functional blocks shown in FIG. 13 are simplified for explanation of the present invention, and needless to say, the baseband processing section is equipped with standard parts. Besides, in FIG. 13, the same parts as those in FIG. 11 are denoted by the same reference numerals as those in FIG. 11 and their detailed explanation is omitted here.

The receiving section of the mobile terminal apparatus UE has a CP removing section 1101, an FFT section 1102, a downlink channel separating section 1103, a downlink control information receiving section 1104, a downlink transmission data receiving section 1105, a channel estimating section 1106, a CQI measuring section 1107, a PMI selecting section 1108, and a plural-cell channel estimating section 1112.

The plural-cell channel estimating section 1112 estimates channel states of plural cells, using a codebook, based on the selected PMIs or channel states. As for this codebook, when the total number of antennas of the radio base station apparatuses of plural cells is greater than the number of antennas supported by the codebook, another codebook to support more antennas is used. With this structure, channel information (PMIs) of the plural cells are combined and transmitted as feedback information for CoMP transmission. For example, when each of two radio base station apparatuses eNB has two transmission antennas, PMIs for four transmission antennas are fed back.

In the radio communication system having the above-described configuration, first, the channel estimating section 1106 of the mobile terminal apparatus UE estimates downlink channel states with use of reference signals included in downlink signals from plural cells. Then, the PMI selecting section 1108 selects PMIs for the respective cells based on the estimated channel states. After that, the plural-cell channel estimating section 1112 combines the selected PMIs together into a plural-cell channel state (PMI obtained from a codebook to support more antennas). The plural-cell channel state is transmitted, with the CQIs of the respective cells, to the radio base station apparatuses eNB as feedback information. In the centralized control type configuration, the feedback information is transmitted to the centralized radio base station apparatus eNB and in the autonomous distributed control type configuration, the feedback information is transmitted to each of the radio base station apparatuses eNB.

The precoding multiplying sections 906 and 918 of the radio base station apparatuses multiply transmission signals by precoding weights corresponding to the PMI indicative of plural-cell channel state. With this radio communication method, it is possible to employ both of the MIMO technique and the CoMP technique in consideration of channel states between the mobile terminal apparatus and the radio base station apparatuses of plural cells.

The present invention has been described in detail by way of the above-described embodiments, however, a person having ordinary skill in the art would understand that the present invention is not limited to the embodiments described in this description. The present invention may be embodied in various modified or altered forms without departing from the spirit or scope of the present invention as defined by the claims. This description has been provided for illustrative purposes only and is by no means intended to limit the present invention.

The disclosure of Japanese Patent Application No. 2011-002111, filed on Jan. 7, 2011, including the specification, drawings, and abstract, is incorporated herein by reference in its entirety.

The invention claimed is:

1. A mobile terminal apparatus comprising:
   a channel estimating section configured to estimate downlink channel states using respective reference signals included in downlink signals from a plurality of cells;
   a PMI (Precoding Matrix Indicator) selecting section configured to select PMIs using a codebook based on the channel states;
   a phase difference estimating section configured to estimate a phase difference between the cells based on the selected PMIs or the channel states; and
   a transmitting section configured to transmit information of the phase difference and the selected PMIs to radio base station apparatuses of the respective cells.

2. The mobile terminal apparatus of claim 1, further comprising:
   a reception quality measuring section configured to measure reception quality of the downlink signals from the cells; and
   a connection cell selecting section configured to select a connection cell based on the measured reception quality,
   wherein the transmitting section transmits information of the connection cell selected by the connection cell selecting section to the radio base station apparatuses of the respective cells.

3. The mobile terminal apparatus of claim 2, wherein the information of the phase difference and the information of the connection cell are quantized together.

4. The mobile terminal apparatus of claim 2, wherein the reception quality comprises reception power or a reception signal to interference and noise power ratio.

5. A radio base station apparatus comprising:
   a receiving section configured to receive an uplink signal including a PMI (Precoding Matrix Indicator) and information of a phase difference between cells;
   a multiplying section configured to multiply a transmission signal by a precoding weight corresponding to the PMI;
   a phase difference adjusting section configured to adjust the phase difference between the cells with use of the information of the phase difference between the cells; and
   a transmitting section configured to transmit the transmission signal by coordinated multi-point transmission.

6. The radio base station apparatus of claim 5, wherein the uplink signal includes information of a connection cell and the coordinated multi-point transmission is performed with a radio base station apparatus of another cell, based on the information of the connection cell.

7. A radio communication method comprising the steps of:
   in a mobile terminal apparatus,
     estimating downlink channel states using respective reference signals included in downlink signals from a plurality of cells;
     selecting PMIs (Precoding Matrix Indicators) using a codebook based on the channel states;
     estimating a phase difference between the cells based on the selected PMIs or the channel states; and
     transmitting information of the phase difference and the selected PMIs to radio base station apparatuses of the respective cells;
   in at least one of the radio base station apparatuses,
     receiving an uplink signal including a PMI and the information of the phase difference between the cells;
     multiplying a transmission signal by a precoding weight corresponding to the PMI;
     adjusting the phase difference between the cells with use of the information of the phase difference between the cells; and
     transmitting the transmission signal to a radio base station apparatus of another cell by coordinated multi-point transmission.

8. The radio communication method of claim 7, further comprising the steps of:
   in the mobile terminal apparatus,
     measuring reception quality of the downlink signals from the cells;
     selecting a connection cell based on the measured reception quality; and
     transmitting information of the selected connection cell to the radio base station apparatuses of the respective cells; and
   in the radio base station apparatus,
     performing the coordinated multi-point transmission to the radio base station apparatus of the other cell based on the information of the connection cell.

* * * * *